April 7, 1970     W. L. HULSLANDER ET AL     3,504,886
VALVE SEAL CONSTRUCTION

Filed July 3, 1967     4 Sheets-Sheet 1

INVENTORS
WILLIAM L. HULSLANDER &
RUSSELL M. HOUGHTON
BY
ATTORNEY.

April 7, 1970  W. L. HULSLANDER ET AL  3,504,886
VALVE SEAL CONSTRUCTION
Filed July 3, 1967  4 Sheets-Sheet 2
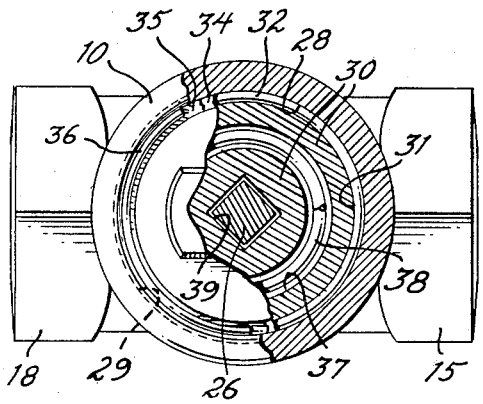
Fig. 5.
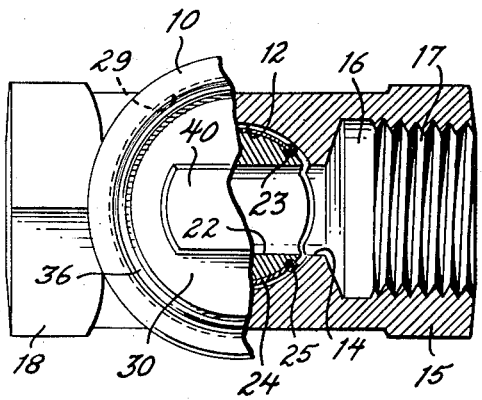
Fig. 6.
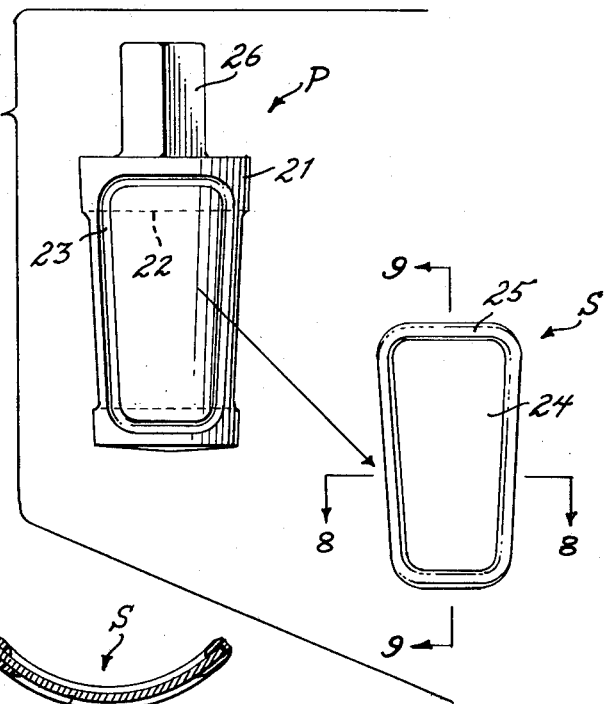
Fig. 7.
Fig. 8.
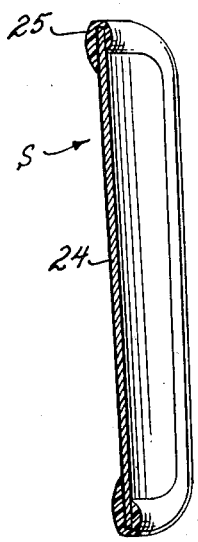
Fig. 9.
INVENTORS
WILLIAM L. HULSLANDER &
BY RUSSELL M. HOUGHTON
ATTORNEY.

April 7, 1970  W. L. HULSLANDER ET AL  3,504,886
VALVE SEAL CONSTRUCTION
Filed July 3, 1967  4 Sheets-Sheet 3

INVENTORS
WILLIAM L. HULSLANDER &
RUSSELL M. HOUGHTON
BY
ATTORNEY

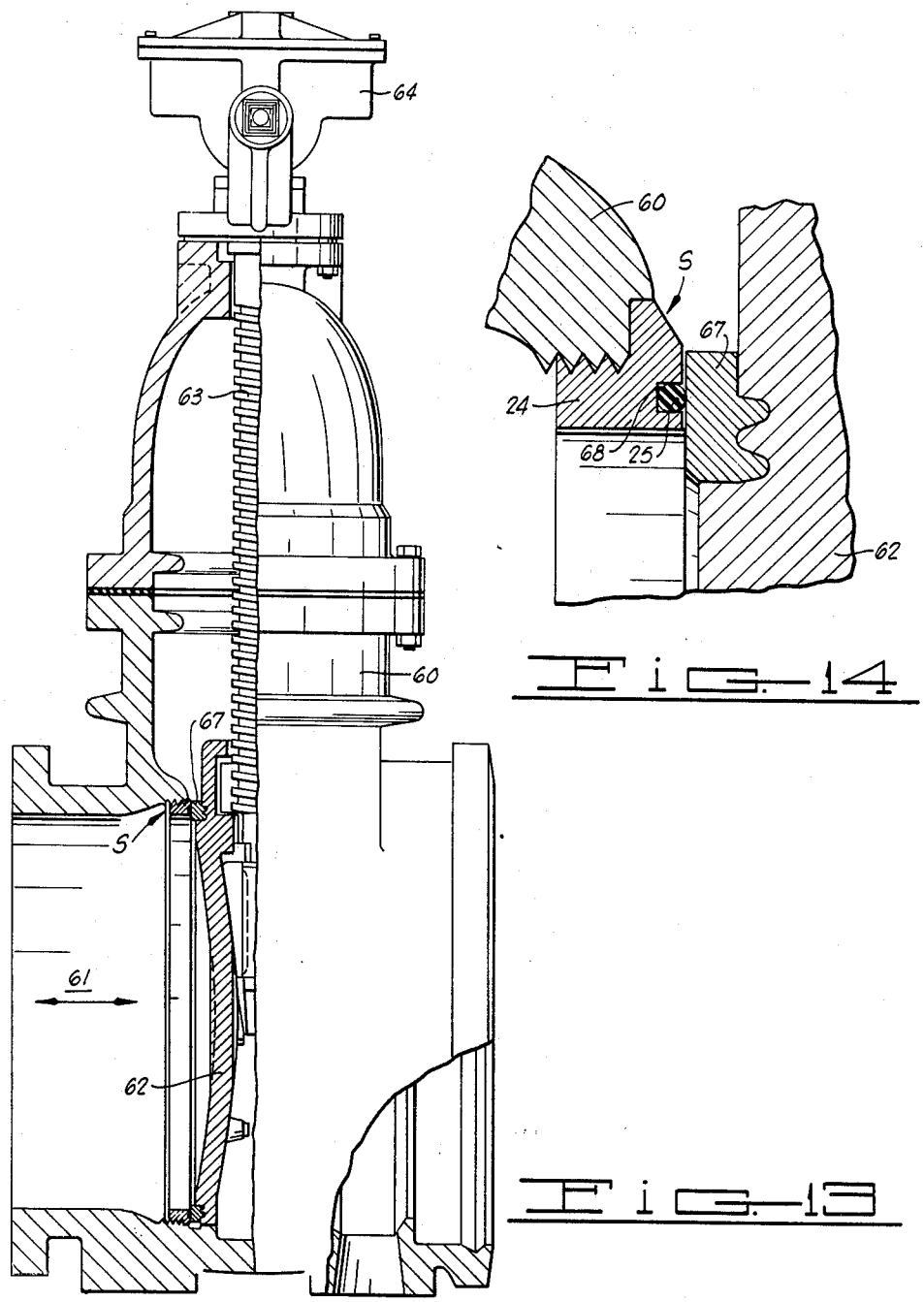

United States Patent Office 3,504,886
Patented Apr. 7, 1970

3,504,886
VALVE SEAL CONSTRUCTION
William L. Hulslander, Bradford, Pa., and Russell M. Houghton, Olean, N.Y., assignors to Dresser Industries, Inc., Dallas, Tex., a corporation of Delaware
Continuation-in-part of applications Ser. No. 407,242, Oct. 28, 1964, and Ser. No. 440,101, Mar. 16, 1965. This application July 3, 1967, Ser. No. 650,953
Int. Cl. F16k 3/02, 5/04
U.S. Cl. 251—184          14 Claims

ABSTRACT OF THE DISCLOSURE

A closure element for use in a fluid shutoff valve to seal the valve against leakage when in shutoff position. The closure element comprises a substrate either rigid or slightly flexible supporting a sealing composition of polyurethane and molybdenum disulfide.

---

This application is a continuation-in-part of application Ser. No. 407,242 filed Oct. 28, 1964 entitled "Polyurethane Compound" now abandoned and Ser. No. 440,101 filed Mar. 16, 1965, entitled "Plug Valve with Floating Seal" now U.S. Patent 3,360,236.

CROSS-REFERENCES TO RELATED APPLICATIONS

Parent applications hereof.

BACKGROUND OF THE INVENTION (a) The art to which the invention pertains includes valves utilized in a piping system for controlling the passage or shutoff of fluid line contents and particularly to gaskets employed in valves to ensure against leakage between the valve elements effecting shutoff.

(b) In shutoff valves of a common variety such as gate valves, plug valves, butterfly valves and the like it is usual to employ a closure member comprising a gate, plug, and vane respectively which is movable within the valve body to either open or close the fluid flow passages therein. Whatever valve type is considered, the closure member is movable relative to a fixed seat or port in the body and a gasket is contained to be situated at the juncture ensuring a positive pressure seal therebetween during shutoff. The gasket is of an elastomeric material and in the prior art valves have usually comprised rubber or synthetics thereof which are inert as not to contaminate the fluid contents of the piping system.

Unfortunately, while elasticity is an essential property of the gasket for sealing purposes it also contributes to a reduced life expectancy by virtue of an increased abrading or shearing action imposed in the path during relative movement of the closure member toward and away from the seat or port. Where the valve is subject to a high frequency of openings and closures, the gasket is unable to maintain its like-new properties and represents a high maintenance item. Since maintenance is both inconvenient and costly, it has long been desired to have a gasket for valve sealing with more durable properties better able to withstand the operating forces imposed thereon by valve service conditions for more prolonged periods without maintenance.

SUMMARY

The invention relates to a novel closure element for use as a pressure seal in a fluid control valve. For whatever valve type the closure element is employed, it comprises a base supporting an elastomer composition with a lubricant preferably comprising polyurethane and molybdenum disulfide formulated with proportions contained within a critical range. When subject to service conditions within the valve its increased tensile strength, tear resistance and the like combined with a reduced friction coefficient enables the closure element hereof to overcome the deficiencies of the prior art devices. By virtue of the enhanced physical properties afforded thereby, valves are able to operate dependably without the frequency of maintenance previously incurred.

It is therefore an object of the invention to provide an improved closure element for effecting a positive seal in a fluid shutoff valve.

It is a further object of the invention to provide a closure element having improved wear properties for service in a shutoff valve as compared to prior art devices.

It is still a further object of the invention to provide a novel closure element with properties as aforesaid and which is inert to the line contents in the majority of installations with which valves of these types are used.

For a full and more complete understanding of the invention, reference may be had to the following description and accompanying drawings, wherein:

FIGURE 5 is a top view partially in section and partially in elevation being taken about on the plane represented by the lines 5—5 of FIGURE 3.

FIGURE 6 is a view similar to FIGURE 5 being taken about on the plane represented by the lines 6—6 of FIGURE 3.

FIGURE 7 is a view in elevation illustrating the plug and closure element hereof in exploded relation.

FIGURE 8 is a detailed section through the closure element being taken about on the plane represented by the line 8—8 of FIGURE 7.

FIGURE 9 is a detailed section through the closure element being taken about on the plane represented by the line 9—9 of FIGURE 7.

FIGURE 13 is a section through a gate valve in which a closure element of the invention is contained; and FIGURE 14 is a fragmentary enlargement of the valve portion in FIGURE 13 containing the closure element.

Figure 1:
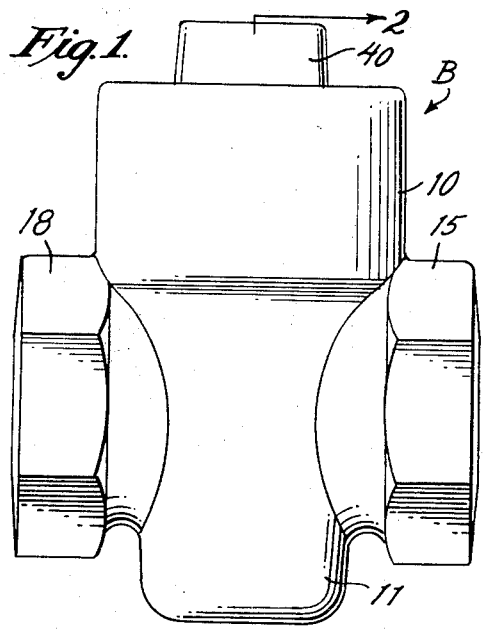
FIGURE 1 is a view in side elevation of a plug valve in which a closure element of the invention is contained.
Figure 2:
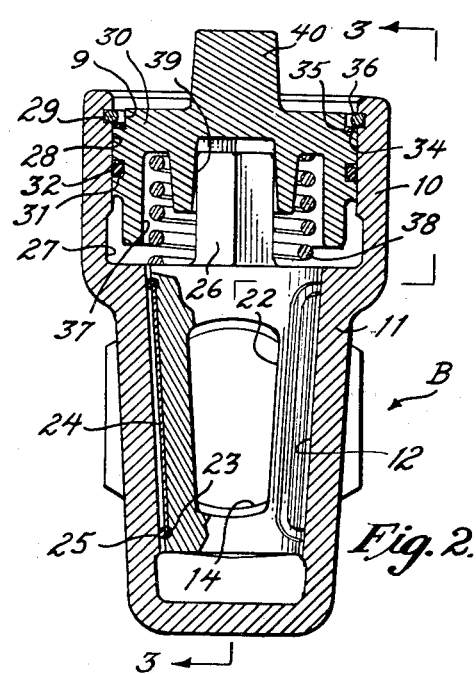
FIGURE 2 is a section through the plug valve of FIGURE 1 being taken about on the plane represented by the line 2—2 of FIGURE 1.
Figure 3:
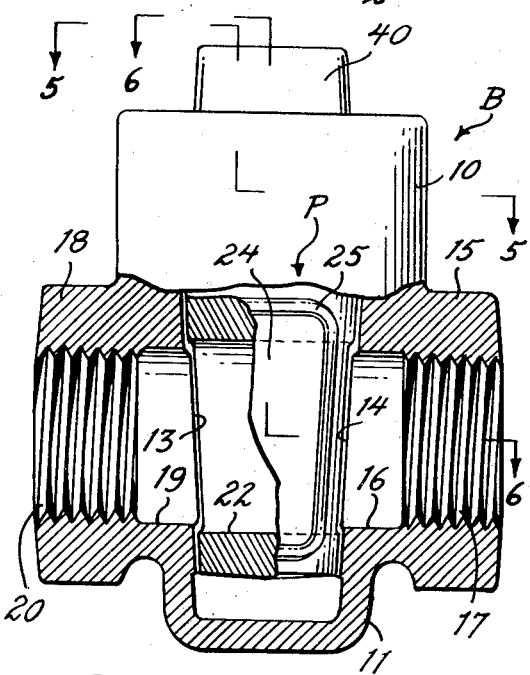
FIGURE 3 is a view taken normal to the showing of FIGURE 2 with parts being shown in elevation and parts in section and with the valve in open position.
Figure 4:
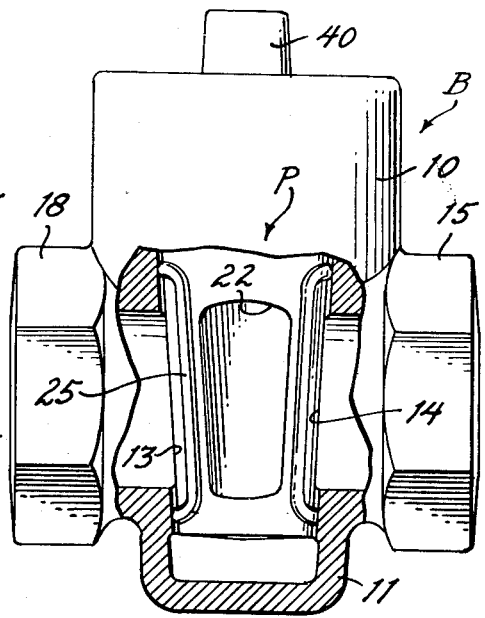
FIGURE 4 is a view similar to FIGURE 3 with the valve in closed position.

With reference to the drawings, the invention will be first described in a preferred embodiment for use in a plug valve. As can be seen in FIGURES 1–4, the valve includes a body or casing illustrated and referred to in its entirety by the reference character B. The body B comprises an upper cylindrical part 10 to which is integrally joined a conical well 11 presenting a tapered bore 12. Opening into the bore 12 of the well 11 from opposite sides are a pair of ports 13 and 14. One of these is the inlet port and the other an outlet port depending on the direction of flow of fluid through the valve.

Extending laterally outwardly from the port 14 is a boss 15 having a bore 16 which terminates in the port 14 and the outer portion of which is internally threaded as shown at 17 to provide for a connection of a fluid line thereto. The boss 15 will ordinarily be of hexagonal shape for wrench engaging purposes. There is also a boss 18 which extends laterally outwardly from the port 13 and which has a bore 19 terminating in the port 13 and the outer internally threaded portion 20.

A plug is referred to in its entirety by the reference character P (see FIGURE 7). The plug P has a main body portion 21 of a conical contour complemental to the tapered bore 12 of the well 11 in which it is received. The plug 21 is formed with a transverse passage 22 of substantially the same size and shape as the ports 13 and 14 which it aligns when the valve is in open position. Spaced substantially 90° from the ends of the passage 22 and disposed therebetween are a pair of shallow recesses 23 formed in the plug P. Received in each recess 23 and in floating relation with respect to the plug P is a closure or sealing element in accordance with the invention and referred to in its entirety by the reference character S as will be described below.

Integrally formed with a conical body 21 and extending upwardly therefrom is a shank 26 of non-circular formation such as the square-cross section illustrated. This shank 26 extends up into the cup-shaped recess 27 (see FIGURE 2) provided by the cylindrical portion 10 of the valve body. The cylindrical part 10 has a bore at 28 which terminates at the top in an inwardly opening annular groove 29.

A spring backing and operating member 30 of cylindrical shape is received in the recesses 27 which includes the bore 28. The outer cylindrical wall of the member 30 is formed with an annular groove 31 which receives an O-ring packing 32. At the top, this spring backing member 30 is formed with an annular recess providing a shoulder at 34 and a cylindrical wall 9 upstanding therefrom. Received in this shoulder 34 is a plastic bearing ring 35, such as Teflon, and a retaining ring 36 is received in the groove 29 and engages the upper face of the bearing ring 35.

The member 30 is formed with a downwardly opening annular recess 37 which receives an expansion coiled spring 38. The upper end of the spring 38 bears against the upper end wall of the recess 37 and the lower end against the upper face of the plug body 21 with the shank 26 passing up through the spring. Member 30 also includes a central socket 39 of a non-circular shape corresponding to the shank 26 which is received therein, and at the top is provided with a wrench engaging member 40. It is evident that a wrench may be applied to the member 40 to rotate the member 30 and through the socket 39 and shank 26, the plug P. Thus, the plug P may be moved from either open or closed position to the other.

During such movement, the front face of the closure elements S hereof which includes a sealing material 25 as will be described, passes over the edges of the ports 13 and 14 and also provides the bearing for the rotative movement. In closed position, one of the closure elements S will be opposite either port 13 or 14 and the other sealing element will be opposite the other port. Depending on the direction of the fluid flow, one of these ports will be the inlet port and the other the outlet port. Pressure from the fluid at the inlet side will if of sufficient magnitude compress the sealing material 25 into its recess 23 and the fluid will pass around the sealing material into the interior of the well. Thus, it will enter behind the closure element at the outlet port and the fluid pressure thereat will force the closure element against the edges of the outlet port. After a period, the pressure within the valve is equalized at the outlet body port while the inlet closure element is approximately in balance with the fluid content under pressure. It is evident that the spring 38 consistently urges the conical plug P down into the well 11; thus, the force of this spring also urge the closure elements against the ports.

Each closure element S comprises a thin, suitably curved, flexible substrate material 24 such as steel on the order of about 1/16 inch in thickness on which is supported a sealing material 25 applied as by injection molding. The coating is usually less than about 1/64 inch thick on each face except about the peripheral edge as will be explained.

It is important to note that the plate 24 has a thickness somewhat in excess of the clearance between the plug P and bore 12 of the well 11. This provides assurance that each closure element S will remain in position in a recess 23. As can be appreciated, the sealing material 25 for optimum effectiveness should have the properties of high abrasive resistance and a low coefficient of friction since it is this sealing material which provides the bearing for rotation of the plug. Moreover, as the plug rotates, the sealing material must pass over the sharp edges defining the ports 13 and 14 and must be resistant to the scarifying effect of such action.

Unlike prior art valves in which both the body and tapered plug are machined to within very close tolerances for a complementary fit and which requires frequent maintenance to retain, the valve body hereof includes an accurately machined internal body bore to receive the plug which need not be accurately machined to within close tolerances. Instead, the plug includes relatively unmachined recesses for in turn receiving the respective closure elements. In order to compensate for the irregularities between the adjacent surfaces, the closure element preferably is adapted to specifically permit a greater deflection on the back face thereof as compared to the front face to assure a nearly parallel position being assumed between the body bore and the plug under the conditions of compression. Moreover, when an elastomer is used as a material of which the sealing faces are molded, it is preferable to restrict the amount of deflection in the sealing face such that when the valve is rotated between open and closed positions, the resilient recovery from compression is not as great as would be if the faces were equally deflected. By this means, the abrasion against the sealing face crossing the edges of the body port can be minimized.

Figure 10:
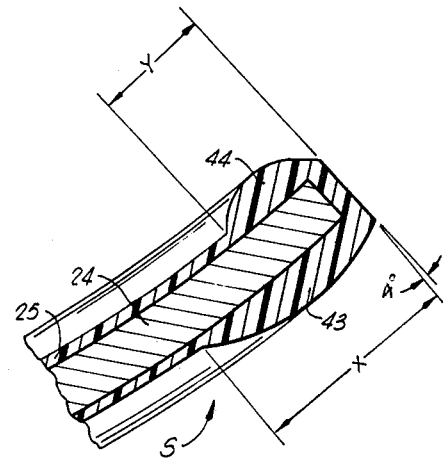
FIGURES 10 and 11 are partial enlargements at the end sections in FIGURES 8 and 9 respectively.
Figure 11:
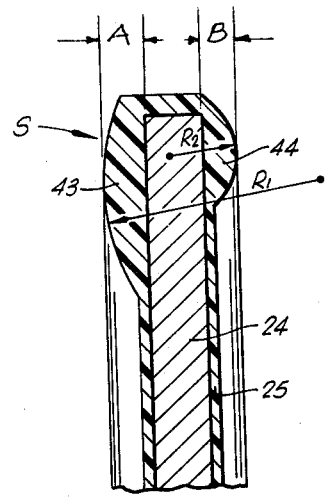

Several techniques can be employed for achieving this controlled deflection, including forming front and rear faces either of dissimilar material or different cross sectional configurations or dimensions or a combination of both. In a preferred embodiment, the same composition comprising the sealing material 25 is used both front and back and as shown in FIGURES 10 and 11 at the ends thereof, the bead 43 on the front sealing face is of different cross sectional configuration than the bead 44 on the rear inward face. In an actual embodiment, bead 43 has a dimension X of approximately 9/64 inch with a radii $R_1$ of also approximately 9/64 inch. Bead 44 on the other hand has a dimension Y of approximately 3/32 inch with a radii $R_2$ to its outside of usually slightly less than about 3/64 inch. A and B are about 1/32 inch each.

Figure 12:
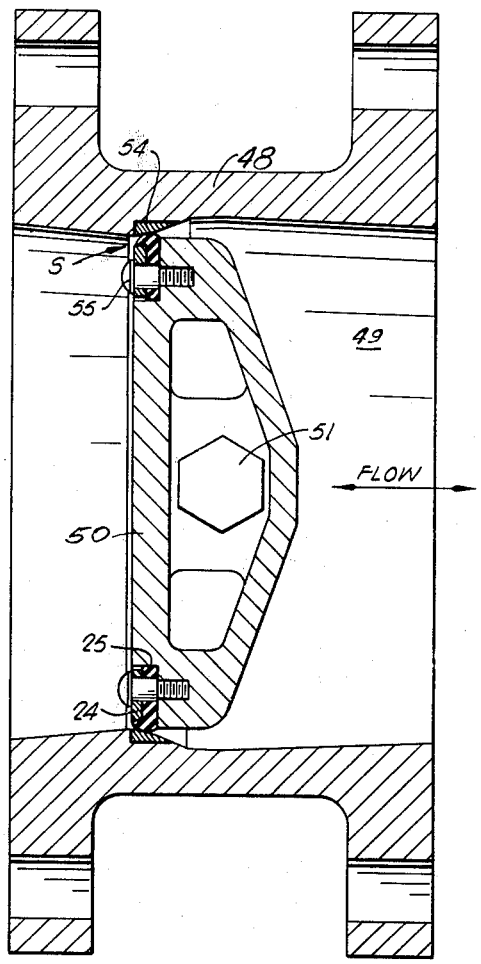
FIGURE 12 is a section through a butterfly valve in which a closure element of the invention is contained.

With reference now to FIGURE 12, there is shown a closure element S as adapted for use in a butterfly valve. As thereshown, the valve comprises a main body section 48 suitable for mounting in a pipe system and having a passage 49 in which fluid is adapted to flow. Interposed in the fluid passage is a circular vane 50 which is rotatable by means of a main shaft 51 suitably journaled in opposite walls in the valve body. When in the open position to permit fluid flow, the vane is rotated 90° from that shown and when in the closed position, is as shown with a closure element S in accordance herewith in sealing tight engagement against an annular seat 54 formed in the body.

The closure element S for use in this valve likewise includes a ringed substrate support 24 on which is formed the sealing material 25 in accordance herewith. The closure element extends peripheraly about the vane face being secured thereto by means of uniformly displaced bolts 55 which pass through the vane and anchor to the main structure thereof. The sealing material also extends radially beyond the vane so as to engage the seat 54 uniformly throughout while maintaining the vane structure free and clear of any interference therewith.

With reference now to FIGURES 13 and 14, the closure element S in accordance herewith is shown as employed in the structure of a standard bevel gear operated gate valve. As there shown, the valve comprises a main housing 60 having a flow passage 61 in which is interposed a removable gate unit 62. Connected to the gate is a supporting stem 63 operable through a gear box 64 via a hand wheel not shown. When the hand wheel is rotated, rotation of the stem 63 effects movement of the gate transverse to the passage 61 usually until completely removed from the position shown to permit free fluid flow through the passage.

On each side face of the gate, raised slightly outwardly therefrom, is an annual disc ring 67 of hard durable material which engages the closure element hereof. The closure element in this embodiment comprises an annular ring 24 having a concentric slot 68 supporting an annular bead of the sealing material 25. As can be seen, the ring 67 is movable with the gate as it advances from between the open and closed position and engages the bead 25 to maintain a positive seal against leakage therepast. By this means leakage cannot occur through the upper portion of the body interior in a manner whereby to bypass the gate between the inlet and outlet ports of the valve during shutoff.

Critical to the invention hereof is the composition comprising the elastomeric sealing material 25. Whatever type valve is employed, it is essential that the sealing material provide a fluid-tight seal to afford positive shutoff when the valve is in closed position. Moreover, because of its vulnerable position between close fitting moving surfaces as the valve is operated between open and close positions, the composition must characteristically be capable of withstanding the scarifying and abrading action incurred thereby during the course of such movement. By affording a low coefficient of friction the material minimizes the forces necessary to effect valve operation. Moreover, the sealing material must be sufficiently yieldable and reslient to fill the void intended to be sealed while retaining these physical properties for long life substantially maintenance free under severe service conditions. Yet further is the important criteria that the composition not contaminate the line contents (e.g. water) controlled by the valve. This is achieved in accordance herewith by a sealing composition generally comprising polyurethane in a proportion ranging from 80 to 50 parts by weight with molybdenum disulfide in a proportion ranging from 20 to 50 parts by weight together with a curing agent which is present in a proportion to achieve the desired curing.

The polyuretane plastics are the reaction product of a polyether glycol or a polyester glycol, an organic diisocyanate, and a chain-extending compound. To accomplish the purpose of the present invention, molybdenum disulfide is incorporated into the urethane prior to the final cure. The final matrix may also be prepared by combining all of the materials at one time and subjecting the mass to a curing schedule by heat, or the process may be carried out in stages. The preferred method is to carry out the process in stages which will be described.

When the process is carried out by the preferred method in stages, a polyurethane prepolymer can be first prepared from a diisocyanate or a mixture of diisocyanates and a polyester glycol or a polyether glycol by employing a mole ratio of diisocyanate to polyester glycol or polyether glycol greater than 1 to 1 and not more than about 3.5 to 1. The prepared prepolymer can also be purchased commercially from the Du Pont de Nemours and Co. under the trademark Adiprene L types 100 and 167.

The polyurethane structure is cured by what is known as a chain-extending or cross linking step after the molybdenum disulfied is incorporated into the prepolymer. The chain-extending agent, or the curing agent, which is used in the preparation of the polyurethane plastics of this invention is a compound containing a plurality of active hydrogen atoms capable of reacting with isocyanates, no more than two atoms in the molecule having active hydrogen attached thereto. The chain extender, or cross-linking agent as it is sometimes called, is used in an amount such that the over-all ratio of isocyanate groups to active hydrogen groups in the final composition is about 0.7 to 1.3. The perferred range is about 0.9 to 1.1. While various curing agents are known and can be employed, a preferred agent is a commercial product marketed by Du Pont under the trademark Moca and is described in United States Patent No. 3,036,996. It is desirable, however, to avoid those curing agents which emit carbon dioxide.

The molybdenum disulfide can be incorporated directly into the urethane prepolymer if all moisture is first removed from the molybdenum disulfide. It may also be milled into an epoxy resin, polyether glycol, or polyester glycol, and then blended with the urethane prepolymer. The curing agent is then added, the blend degassed to remove dissolved and entrapped air and gas, and then the blend is cast or molded into the desired shape.

For example, molybdenum disulfide having a particle size of 325 mesh was incorporated into an epoxy resin at a ratio of 65 parts of molybdenum disulfide to 35 parts of epoxy resin. The molybdenum disulfide was first dried at 350° F. for 36 hours at 1 mm. of mercury absolute pressure to remove all moisture, and was then milled into the epoxy resin on a three-roll mill. This dispersion was added to the urethane prepolymer, and the required amount of aromatic diamine curing agent was added. The amount of diamine required is calculated on the basis of the reactivity of both the epoxy resin and the urethane prepolymer.

The total amount of molybdenum disulfide to be incorporated in the cured composition is dependent on the end use requirement. The following table outlines the range of proportion which will provide a polyurethane composition having required properties:

(1) 80 to 50 parts by weight of polyurethane prepolymer.
(2) 20 to 50 parts by weight of molybdenum disulfide.
(3) A suitable curing agent such as the Moca mentioned above in the amount necessary to achieve the desired curing.

As a preferred embodiment of the invention, the following formula is given:

(1) 60 parts by weight of polyurethane prepolymer.
(2) 40 parts by weight of molybdenum disulfide powder.
(3) 12 parts by weight of Du Pont's Moca (methylene bis-o-chloroaniline).

A polyurethane composition formulated in accordance with the formula of the preceeding paragraph will have the following typical physical properties:

Tensile strength—2400 p.s.i.
Elongation—320%
Compression set—1.9% @ 30 minutes; 1.5% @ 3 hours.
Shore A hardness—91–94
Tear resistance—575 p.s.i.
Coefficient of friction @ 200–400 p.s.i. load—.2–.3.

These properties particularly adapt the material for use as a sealing element for severe service valve operation since it provides an elastic yet tough, durable composition capable of withstanding the wear imposed thereon by valve operation. By virtue of its low friction coefficient, the seal reduces the forces required for valve operation without the introduction of other elements which would contaminate the line contents of the piping system in which valves of this type are installed.

We claim:
1. A valve comprising in combination
   (a) a body defining a fluid passage between ports for the inlet and outlet of fluid flow,

(b) an operable closure member within said body supported movable from a first position in which said passage is open between said ports to a second position in which said passage is closed between said ports, and (c) a closure seal extending interposed between said body and said closure member when the latter is in said second position to provide a fluid tight seal thereat, (d) said closure seal comprising a base supporting a polymerized polyurethane elastomeric composition including from about 20 to about 50 parts by weight of molybdenum disulfide.

2. A valve according to claim 1 in which said closure seal is secured on said valve body stationary relative to said closure member and said closure member comprises a gate movable transverse to the fluid passage in said body.

3. A valve according to claim 1 in which said closure seal is mounted on the exterior surface of said closure member for movement therewith.

4. A valve according to claim 3 in which said closure member comprises a rotatable butterfly vane and said closure seal is secured annularly extending about the periphery of said vane.

5. A valve according to claim 3 in which said closure member comprises a rotatable plug received within a body well extending into said body passage.

6. A valve according to claim 5 in which the base of said closure seal is curvilinear of extent sufficient to interposedly span the passage to said valve body and said sealing composition is molded to the surface thereof for facing said body passage at which said seal is to be effected.

7. In a valve including a body defining a fluid passage between ports for the inlet and outlet of fluid flow, a closure member within said body supported for movement from a first position in which said passage is open between said ports to a second position in which said passage is closed between said ports, the improvement comprising a closure seal extending interposed between said body and said closure member when the latter is in said second position to provide a fluid tight seal thereat, said closure seal comprising:

(a) a support base; and (b) an elastomeric seal supported on said base comprising a cured elastomeric composition consisting essentially from about 80% to about 50% by weight of polyurethane and from about 20% to about 50% by weight of molybdenum disulfide.

8. A valve according to claim 7 in which said closure member comprises a rotatable butterfly vane and said closure seal is secured annularly extending about the periphery of said vane.

9. The improvement according to claim 7 in which said sealing composition is molded onto said base.

10. The improvement according to claim 9 in which said sealing composition is formed with a continuous bead extending substantially coextensive about the periphery of said base and raised from the central portions thereof.

11. The improvement according to claim 9 in which said base is formed of a thin cross section supporting said sealing composition on both faces each having a continuous bead extending substantially coextensive with the periphery of said base and raised from the central portions thereof, in which the bead on one face of said base permits a greater compression deflection than does the bead on the other face of said base.

12. The improvement according to claim 9 in which said closure seal is mounted on the exterior surface of said closure member for movement therewith.

13. The improvement according to claim 12 in which said closure member comprises a rotatable plug received within a body well extending into said body passage, and said base is formed of a thin cross section supporting said sealing composition on both faces each having a continuous bead extending substantially coextensive with the periphery of said base and raised from the central portions thereof, in which the bead on one face of said base permits a greater compression deflection than does the bead on the other face of said base.

14. The improvement according to claim 13 in which said seal base is curvilinear of extent sufficient to interposedly span the passage to said valve body.

References Cited

UNITED STATES PATENTS

| | | | |
|---|---|---|---|
| 3,084,715 | 4/1963 | Scharres | 137—601 |
| 2,989,990 | 6/1961 | Bass | 251—368 X |
| 3,108,779 | 10/1963 | Anderson | 251—368 X |
| 3,188,048 | 6/1965 | Sutherland | 251—368 X |
| 3,331,582 | 7/1967 | Ford | 251—368 X |
| 3,360,236 | 12/1967 | Hulslander | 251—317 X |
| 3,395,890 | 8/1968 | Eckert | 251—368 X |

CLARENCE R. GORDON, Primary Examiner

U.S. Cl. X.R.

251—306, 314, 328, 368